US006612217B1

(12) United States Patent
Shockey et al.

(10) Patent No.: US 6,612,217 B1
(45) Date of Patent: *Sep. 2, 2003

(54) PENETRATION RESISTANT FABRIC STRUCTURES AND MATERIALS

(75) Inventors: Donald A. Shockey, Menlo Park, CA (US); David C. Erlich, Palo Alto, CA (US); Jeffrey W. Simons, Palo Alto, CA (US)

(73) Assignee: SRI International, Menlo Park, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,596

(22) Filed: Jun. 2, 1999

Related U.S. Application Data

(60) Provisional application No. 60/087,771, filed on Jun. 2, 1998.

(51) Int. Cl.[7] ............................. F41H 5/04; B64D 7/00
(52) U.S. Cl. ....................... 89/36.11; 89/36.02; 244/121
(58) Field of Search ..................... 89/36.01, 36.02, 89/36.11; 244/119, 121

(56) References Cited

U.S. PATENT DOCUMENTS

| | | | | |
|---|---|---|---|---|
| 2,353,447 A | * | 7/1944 | Doherty | 89/36.11 |
| 2,401,247 A | * | 5/1946 | Hunter | 89/36.11 |
| 3,740,905 A | * | 6/1973 | Adams | 244/119 |
| 5,080,306 A | * | 1/1992 | Porter et al. | 428/920 |
| 5,102,723 A | * | 4/1992 | Pepin | 428/223 |

(List continued on next page.)

FOREIGN PATENT DOCUMENTS

| | | | | |
|---|---|---|---|---|
| EP | 0757752 B1 | 6/1998 | | |
| EP | 0763163 B1 | 6/1998 | | |
| EP | 0763164 B1 | 6/1998 | | |
| GB | 2277141 | * | 10/1994 | 89/36.02 |
| JP | 2183798 | * | 7/1990 | 89/36.02 |

OTHER PUBLICATIONS

English translation of Nagumo 2,183,798.*
N/A, "Aramid Fibers Special Features," International Defense Review vol. 17, No. 6, 84–00; one page, no date.
Gerstle, "Analysis of Rotor Fragment Impact on Ballistic Fabric Engine Burst Containment Shields," Apr. 12, 1995, Journal of Aircraft; pp. 388–393.

*Primary Examiner*—Stephen M. Johnson
(74) *Attorney, Agent, or Firm*—Perkins Coie LLP

(57) ABSTRACT

A ballistic barrier for protecting an aircraft from damage due to projectile penetration, the aircraft having a fuselage including an outer skin, an inner panel and a structure. The ballistic barrier includes at least one layer of high strength fabric disposed between the outer skin and the inner panel of the aircraft which is substantially fixedly positioned with respect to the fuselage of the aircraft. Preferably, the at least one layer of high strength fabric comprises a plurality of plies. One of the plies can be a felt. Another of the plies can comprise woven fibers. Also preferably, the at least one layer of high strength fabric comprises a polymer material such as one or more of aramid material, polyethylene material, and polybenzoxazole material. The layer of high strength fabric can be attached to at least one of the frames of the structure of the fuselage, to a layer of insulation positioned between the outer skin and inner panel of the fuselage of the aircraft, or be enclosed within an outer covering of a layer of insulation positioned between the outer skin and inner panel of the fuselage of the aircraft.

20 Claims, 18 Drawing Sheets

U.S. PATENT DOCUMENTS

| | | | | |
|---|---|---|---|---|
| 5,200,256 A | * | 4/1993 | Dunbar | 89/36.01 |
| 5,409,349 A | | 4/1995 | Kulak et al. | 415/9 |
| 5,413,456 A | | 5/1995 | Kulak et al. | 415/9 |
| 5,437,538 A | | 8/1995 | Mitchell | 415/9 |
| 5,440,965 A | * | 8/1995 | Cordova et al. | 89/36.02 |
| 5,472,760 A | * | 12/1995 | Norvell | 244/119 |
| 5,516,257 A | | 5/1996 | Kasprow et al. | 415/9 |
| 5,527,597 A | * | 6/1996 | Stanhope et al. | 428/231 |
| 5,747,721 A | * | 5/1998 | Speakes et al. | 89/36.11 |
| 5,759,659 A | * | 6/1998 | Sanocki et al. | 244/119 |
| 5,776,839 A | * | 7/1998 | Dischler et al. | 89/36.01 |
| 6,119,575 A | * | 9/2000 | Dragone et al. | 89/36.05 |

* cited by examiner

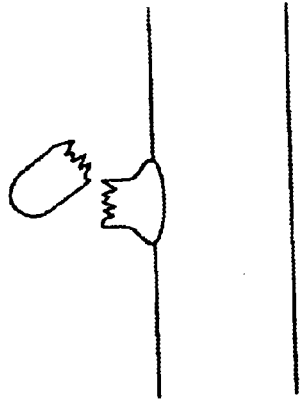
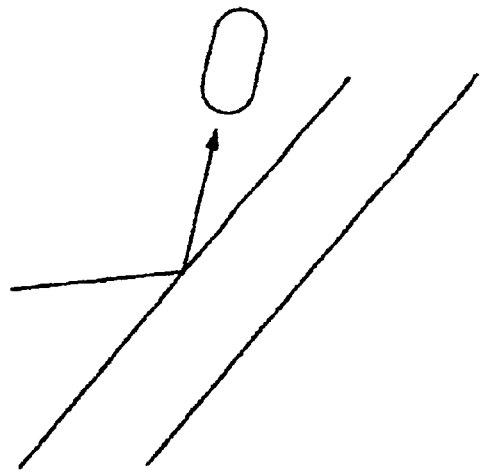
FIG. 1A  FIG. 1B
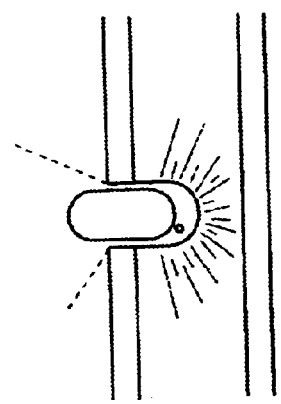
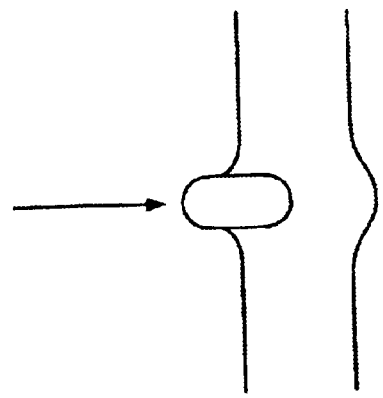
FIG. 1C  FIG. 1D

| TEST NO. | TARGET | | | | AREAL DENSITY (G/CM²) | FS[B]: BEFORE IMPACT | | | FS: AFTER PENETRATION | | | SPECIFIC ENERGY ABSORBED[C] (J/G/CM²) |
|---|---|---|---|---|---|---|---|---|---|---|---|---|
| | MATERIAL(S) | MESH (YARNS/IN.) | THICKNESS PER PLY (IN.) | NO. OF PLIES | | MASS (G) | VELOCITY (M/S) | K.E. (J) | VELOCITY (M/S) | K.E. (J) | K.E. LOST (%) | |
| 20 | ZYLON | 30X30 | ≈0.006 | 1 | 0.0130 | 25 | 79 | 78 | 61.5 | 47.5 30.5 | 39 | 2346 |
| 26 | ZYLON | 30X30 | ≈0.006 | 1 | 0.0130 | 25 | 82.5 | 85 | 63 | 49.5 34.5 | 41 | 2654 |
| 23 | ZYLON UHMW POLYETHYLENE FELT | 30X30 | ≈0.006 ≈0.13 | 1 1 | 0.0130 +0.0309 | 25 | 80 | 80 | 35.5[F] | 20[F] 60 | 75 | 1366 |
| 22 | ZYLON UHMW POLYETHYLENE FELT | 30X30 | ≈0.006 ≈0.13 | 1 2 | 0.0130 +0.0618 | 25 | 82 | 84 | DID NOT PENETRATE[G] | 84 | 100 | ≥1123 |

[B] FS MEANS FRAGMENT SIMULATOR.

[C] SPECIFIC ENERGY ABSORBED (SEA) IS DEFINED AS ENERGY ABSORBED PER UNIT AREAL DENSITY.

[F] THE IMPACTOR DID NOT PENETRATE THE FELT; HOWEVER, THE IMPACTOR, SURROUNDED BY THE FELT LAYER, COMPLETELY PENETRATED THE FABRIC.

[G] ONLY PARTIAL PENETRATION WAS OBTAINED IN THIS TEST-THE IMPACTOR, SURROUNDED BY THE FELT, REMAINED LODGED IN THE HOLE IN THE FABRIC.

FIG. 2

| TEST NO.[A] | TARGET | | | | | FS[B]: BEFORE IMPACT | | | FS: AFTER PENETRATION | | | | SPECIFIC ENERGY ABSORBED[C] (J/G/CM$^2$) |
|---|---|---|---|---|---|---|---|---|---|---|---|---|---|
| | MATERIAL(S) | MESH (YARNS/IN.) | THICKNESS PER PLY (IN.) | NO. OF PLIES | AREAL DENSITY (G/CM$^2$) | MASS (G) | VELOCITY (M/S) | K.E. (J) | VELOCITY (M/S) | K.E. (J) | K.E. LOST (J) | K.E. LOST (%) | |
| 13 | ZYLON | 45X45 | ≈0.011 | 1 | 0.0219 | 25 | 78 | 76 | 29 | 10.5 | 65.5 | 86 | 2990 |
| 19[D] | ZYLON | 45X45 | ≈0.011 | 2 | 0.0438 | 25 | 113 | 160 | 64 | 51.5 | 108.5 | 68 | 2477 |
| 20 | ZYLON | 30X30 | ≈0.006 | 1 | 0.0130 | 25 | 79 | 78 | 61.5 | 47.5 | 30.5 | 39 | 2346 |
| 26 | ZYLON | 30X30 | ≈0.006 | 1 | 0.0130 | 25 | 82.5 | 85 | 63 | 49.5 | 34.5 | 41 | 2654 |
| 25 | ZYLON | 35X35 | ≈0.0075 | 1 | 0.0158 | 25 | 77.5 | 75 | 59 | 43.5 | 37.5 | 42 | 2373 |
| 24 | ZYLON | 40X40 | ≈0.009 | 1 | 0.0185 | 25 | 79 | 78 | 49.5 | 30.5 | 48.5 | 61 | 2622 |
| 29 | ZYLON | 40X40 | ≈0.009 | 4 | 0.0740 | 96 | 79 | 300 | 27.5 | 36.5 | 263.5 | 88 | 3560 |
| 32 | ZYLON | 40X40 | ≈0.009 | 6 | 0.111 | 96 | 79 | 300 | DID NOT PENETRATE[E] | | 300 | 100 | 2702 |
| 23 | ZYLON UHMW POLYETHYLENE FELT | 30X30 | ≈0.006 ≈0.13 | 1 1 | 0.0130 +0.0309 | 25 | 80 | 80 | 35.5[F] | 20[F] | 60 | 75 | — |
| 22 | ZYLON UHMW POLYETHYLENE FELT | 30X30 | ≈0.006 ≈0.13 | 1 2 | 0.0130 +0.0618 | 25 | 82 | 84 | DID NOT PENETRATE[G] | | 84 | 100 | — |

[A] TESTS 13 AND 19 WERE PERFORMED AND REPORTED DURING THE PREVIOUS REPORTING YEAR.

[B] FRAGMENT SIMULATOR.

[C] SPECIFIC ENERGY ABSORBED (SEA) IS DEFINED AS ENERGY ABSORBED PER UNIT AREAL DENSITY.

[D] DATA FROM THIS TEST ARE QUESTIONABLE DUE TO THE EXCESSIVE PITCH, DEBRIS FROM THE ALUMINUM HONEYCOMB MOMENTUM TRAP TRAVELING AHEAD OF THE IMPACTOR, AND SOME PBO FIBERS FROM THE BACK (22° ORIENTATION) LAYER BREAKING AT THE CORNER OF THE CLAMPING ROD, AND THUS LIKELY REDUCING THE ABSORBED KINETIC ENERGY.

[E] THE IMPACTOR PENETRATED ONLY THE FIRST OF THE SIX LAYERS.

[F] THE IMPACTOR DID NOT PENETRATE THE FELT; HOWEVER, THE IMPACTOR, SURROUNDED BY THE FELT LAYER, COMPLETELY PENETRATED THE FABRIC.

[G] ONLY PARTIAL PENETRATION WAS OBTAINED IN THIS TEST-THE IMPACTOR, SURROUNDED BY THE FELT, REMAINED LODGED IN THE HOLE IN THE FABRIC.

FIG. 3

| TEST NO. | VIDEO | TEST DATE (1998) | TARGET MATERIAL FABRIC TYPE (YARN COUNT) | NO. PLIES | AREAL DENSITY (G/CM²) | GRIPPED EDGES[A] # TO WIDTH | | PENETRATOR | | STROKE RATE[D] (IN./S) | DATA RATE (MS) | 1ST YARN BREAK | | FAILURE STROKE[E] (IN.) | MAXIMUM | | YARNS BROKEN (WARP +FILL) | WORK DONE[F] | | PER BROKEN YARN (J) | SEA (J/G/CM²) |
|---|---|---|---|---|---|---|---|---|---|---|---|---|---|---|---|---|---|---|---|---|---|
| | | | | | | NO. YARNS | (IN.) | TYPE[B] | ORIENTATION[C] | | | STROKE (IN.) | LOAD (LB) | | LOAD (LB) | MODULUS (LB/IN) | | (IN-LB) | (J) | | |
| P-22 | ✓ | 4/23 | ZYLON 35X35 WEAVE | 1 | 0.0158 | 4 W&F | 5.0 | 29-G FB | 45° | 0.075 | 10 | 0.488 | 153 | 0.757 | 153 | 742 | 33+38=71 | 42 | 5 | 0.07 | 300 |
| P-23 | ✓ | 4/23 | ZYLON 35X35 WEAVE ZYLON FELT #2 | 1 2 | 0.0158 0.0160 | 4 W&F NOT GRIPPED | 5.0 | 29-G FB TOTAL AREAL DENSITY = 0.0318 | 45° | 0.075 | 10 | 0.697 | 493 | 1.035 | 634 | 2545 | 35+36=71 | 220 | 25 | 0.35 | 782 |
| P-26 | ✓ | 4/28 | ZYLON 35X35 WEAVE ZYLON FELT #2 | 1 1 | 0.0158 0.0080 | 4 W&F NOT GRIPPED | 5.0 | 29-G FB TOTAL AREAL DENSITY = 0.0238 | 45° | 0.075 | 10 | 0.672 | 400 | 1.023 | 484 | 1778 | 32+37=69 | 208 | 23 | 0.34 | 967 |
| P-28 | ✓ | 4/29 | ZYLON 35X35 WEAVE | 1 | 0.0158 | 2 F | 5.0 | 29-G FB | 45° | 0.075 | 10 | 0.687 | 260 | 1.330 | 277 | 954 | 26+42=68 | 174 | 20 | 0.29 | 1244 |
| P-29 | ✓ | 4/30 | ZYLON 35X35 WEAVE ZYLON FELT #2 | 1 2 | 0.0158 0.0160 | 2 F NOT GRIPPED | 5.0 | 29-G FB TOTAL AREAL DENSITY = 0.0318 | 45° | 0.075 | 10 | 0.781 | 398 | ≈2.70 | 506 | 1585 | 2+33=35 | 687 | 78 | 2.22 | 2441 |
| P-30 | ✓ | 5/7 | ZYLON 35X35 WEAVE | 1 | 0.0158 | 2 F | 5.0 | ROUNDED FB | 45° | 0.075 | 10 | 0.612 | 214 | 1.232 | 214 | 829 | 29+41=70 | 120 | 14 | 0.19 | 858 |
| P-31 | ✓ | 5/7 | ZYLON 35X35 WEAVE ZYLON FELT #2 | 1 2 | 0.0158 0.0160 | 2 F NOT GRIPPED | 5.0 | ROUNDED FB TOTAL AREAL DENSITY = 0.0318 | 45° | 0.075 | 10 | 0.834 | 463 | ≈2.70 | 478 | 1301 | 2+31=33 | 661 | 75 | 2.26 | 2348 |
| P-35 | ✓ | 5/13 | ZYLON 35X35 WEAVE | 1 | 0.0158 | 2 F | 5.0 | 29-G FB | 0° | 0.075 | 10 | 0.667 | 288 | 1.051 | 288 | 1127 | 1+53=54 | 106 | 12 | 0.22 | 758 |
| P-36 | ✓ | 5/14 | ZYLON 35X35 WEAVE ZYLON FELT #2 | 1 2 | 0.0158 0.0160 | 2 F NOT GRIPPED | 5.0 | 29-G FB TOTAL AREAL DENSITY = 0.0318 | 0° | 0.075 | 10 | 0.764 | 388 | ≈3.4 | 587 | 1773 | | 943 | 107 | | 3350 |
| P-37 | ✓ | 5/20 | ZYLON 35X35 WEAVE | 1 | 0.0158 | 2 F | 5.0 | 25-G FS-SH | 0° | 0.075 | 10 | 0.572 | 240 | 0.767 | 269 | 974 | | 81 | 9 | | 579 |
| P-38 | ✓ | 5/20 | ZYLON 35X35 WEAVE ZYLON FELT #2 | 1 2 | 0.0158 0.0160 | 2 F NOT GRIPPED | 5.0 | 25-G FS-SH TOTAL AREAL DENSITY = 0.0318 | 0° | 0.075 | 10 | 0.792? | 377? | >2.2 | 532 | 1475 | | 433 | 49 | | 1538 |

[A] W = WARP YARNS; F = FILL YARNS.
[B] FS = FRAGMENT SIMULATOR; FB = FAN BLADE
[C] THE ANGLE BETWEEN THE DIRECTION OF THE WARP YARNS AND THE LONGEST DIMENSION OF THE PENETRATOR'S IMPACT END (e.g., THE BLADE DIRECTION).
[D] TESTS INVOLVE CONSTANT STROKE RATE TO COMPLETE PENETRATION, EXCEPT WHERE MARKED "C" (CYCLICAL LOADING) OR "I" (INTERRUPTED BEFORE FULL PENETRATION)
[E] DATA IS FOR COMPLETE PENETRATION, EXCEPT FOR INTERRUPTED TESTS (MARKED "I"), WHERE DATA IS AT MAXIMUM BEFORE INTERRUPTION.
[F] EQUALS THE AREA UNDER THE LOAD-DEFLECTION CURVE.

FIG. 4

PENETRATION RESISTANT FABRIC STRUCTURES AND MATERIALS

CROSS REFERENCE TO RELATED APPLICATIONS

This application claims the benefit of U.S. Provisional Application No. 60/087,771, filed Jun. 2, 1998, now abandoned, and which is incorporated herein by reference for all purposes.

U.S. GOVERNMENT RIGHTS

This invention was made in part with government support under contract number 95-G-010 awarded by the Department of Transportation, Federal Aviation Administration. The government has certain rights in the invention.

BACKGROUND OF THE INVENTION

1. Technical Field

This invention relates generally to penetration shields, and, more particularly, to penetration resistant fabric structures and materials used to absorb energy and a arrest projectiles.

2. Description of the Related Art

Over the years several civil aircraft accidents having catastrophic consequences have resulted from damage to critical aircraft components by flying engine fragments produced by an in-flight engine failure. Four systems are critical for continued safe operation and landing of an aircraft: the flight control lines, the fuel lines, the engines, and the pressure boundary. The flight control lines, which are separated spatially in the aircraft and redundant, must not be severed by engine fragments. Likewise, second or third engines need to be operational and thus must not be incapacitated by fragments from a failed engine. Finally, compromise of the pressure boundary (holes and tears in the fuselage wall, for example) at typical cruising altitudes could be catastrophic. The desire to provide ballistic protection at minimum weight and cost and to reduce still further the risk of a catastrophic accident from in-flight engine failure requires low weight with high ballistic properties.

To counter damage caused by projectile penetration, many types of barrier systems have been constructed. Steels have traditionally been the material of choice for vehicle armor. As shown in FIG. 1a, hard steel surfaces produce large stresses in perpendicularly impacting projectiles, blunting the leading edges and/or breaking them into two or more pieces. Further, as illustrated in FIG. 1b, steel surfaces are effective in deflecting projectiles striking the surfaces at an angle. Besides their effectiveness in defeating impacting projectiles, steels are inexpensive relative to other materials and are excellent structurally; being weldable, durable, formable, corrosion resistant, compatible with other structural components, and field repairable. The main drawback of steels is their high density, which results in heavy armor structures and renders them especially unsuitable for use in aircraft.

Ceramics have also been used in the construction of barrier systems. Ceramics make good armor and in many instances outperform conventional rolled homogeneous steel armor. High compressive strength allows ceramics to exert large stresses on high speed impacting projectiles, stresses that act to deform, deflect, and fracture the projectile as shown in FIGS. 1a and 1b, as well as eroding the leading edge of penetrating projectiles and eventually reducing them to particles, as illustrated in FIG. 1c. This is very effective against rapidly moving bullets. However, the ability of ceramics to deform, deflect, fracture, and erode a projectile decreases as the velocity of the projectile decreases, because at low projectile velocities fracture of the ceramics occurs at very early times during traverse of the projectile, thereby increasing the probability that the projectile will succeed in piercing the barrier system.

Polymeric fibers are competitive with metals and superior to ceramics at lower projectile velocities. These fibers deform to absorb the kinetic energy of projectiles striking them, slowing or stopping the projectile. However, polymeric barriers have been primarily positioned within the engine nacelle. Thus, much of the area from which flying debris could be projected remains uncovered, such as the intake and exhaust ports, from which projected debris could strike the fuselage and damage critical components of the aircraft. Further, elevated temperatures place constraints on the use of such materials inside the engine nacelle. Most importantly, most polymeric fibers are flammable, making their use dangerous.

SUMMARY OF THE INVENTION

This invention relates to a ballistic barrier system. More specifically, the invention provides for low weight, high energy absorbing, multiple function structures and materials for superior ballistic protection against projectiles, from munitions and/or fragments of high speed machine components. Most commonly, it is anticipated that the ballistic barrier will be used in combination with aircraft. The ballistic barrier may also be used in combination with aircraft luggage and cargo containers; VIP limousines; body armor including helmets; shields for back-of-the-armor debris on battle tanks, personnel carriers; or use on or with any other structure or object where protection against projectiles is important.

In one embodiment, a ballistic barrier comprised of one or more layers of high-strength fabric positioned in the fuselage wall between the outer metal skin and the interior panels and/or around the turbo engines of commercial aircraft to prevent engine fragments from penetrating the aircraft fuselage thereby injuring passengers and/or damaging critical aircraft components. The high strength material is resistant to penetration by projectiles, and is designed to absorb kinetic energy of impacting projectiles to slow or stop them. The high strength fabric is fixedly or substantially fixedly positioned with respect to the fuselage of the aircraft. Such ballistic barriers are more optimal in terms of weight, cost, and ease of installation as well as for removal for aircraft inspections.

The layer of high strength fabric may comprise a plurality of plies to achieve a desired measure of ballistic resistance. One of the plies may be a felt. Another of the plies may be comprised of woven fibers. The felt has two ballistic functions: to slow the projectile before it strikes a second ply and blanket the sharp edges of the projectile tip to create a larger and blunter leading edge of the projectile, which makes it more difficult for the projectile to penetrate second ply.

The fabric of the ballistic barrier may be comprised of woven fibers. At least one layer of the high strength fabric can comprise one or more layers of fabric made from high strength polymeric fibers such as aramid ultrahigh molecular weight polyethylene or polybenzoxazole, or a combination thereof, and one or more layers of a felt made from these fibers. The felt may be in contact with the fabric layers, or stand off at a distance. The felt may be encapsulated by a water-tight material to prevent moisture absorption.

The fabric can be made of lightweight polymer fibers configured in one of many types of constructs—2- and 3-dimensional weaves, felts, non-wovens, and lay-ups—either singly or assembled in layers or as laminates, in one of many geometries and fiber mixes, and may include metallic or ceramic or composite materials that are resistant to impact and penetration by projectiles such as fragments or bullets.

The layer of high strength fabric may be positioned at various locations in the fuselage with respect to the components of the fuselage. In one embodiment, the ballistic barrier is coupled to one or more of a plurality of frames of the structure of the fuselage of the aircraft to cover the generally open areas of a frame. Projectiles striking the structural beams of the frame are slowed, stopped, or deflected. The ballistic barrier slows or stops projectiles attempting to pass through the substantially open areas of the frame of the structure.

In another embodiment, at least one layer of the ballistic barrier can be coupled to a layer of insulation positioned between the outer skin and inner panel of the fuselage. Alternatively, at least one layer of the ballistic barrier can be enclosed within an outer covering of the layer of insulation. This configuration prevents moisture from being absorbed by the ballistic barrier.

Protection of particular components of the aircraft may be protected by at least one layer of the ballistic barrier wrapped around the component disposed within the aircraft fuselage.

In an embodiment of the present invention, at least one layer of high strength fabric is positioned towards the outer skin of the aircraft and is fixedly or substantially fixedly positioned with respect to the fuselage of the aircraft. This arrangement has the advantage of protecting components found in the fuselage between the inner panel and the outer skin, such as control lines and the like. Further, a projectile will be slowed considerably before striking the inner panel.

The layer of high strength fabric may be coupled to one or more of the frames of the structure of the fuselage. The layer can also be coupled to a layer of insulation or be enclosed within an outer covering of the layer of insulation. This positioning holds the layer away from the outer skin, preventing moisture from being absorbed by the ballistic barrier and corroding the outer skin.

Another embodiment of the present invention is designed to provide local protection to inner components of an aircraft, such as fuel and control lines by deflecting a projectile. In such an embodiment, the ballistic barrier is constructed of one or more layers of a high strength material that are oriented at an incline relative to an anticipated line of motion of a projectile to deflect the projectile away from the component. Such a barrier would make use of existing aircraft structure, such as longerons, cargo bay floor, and baggage compartment, for mounting. The high strength material may comprise a laminate of one or more of polymer material, ceramic material, and metal alloy. The polymer material should be positioned such that it will be struck by the projectile first. If all three materials are used, the ceramic material should be positioned between the polymer material and metal alloy.

BRIEF DESCRIPTION OF THE DRAWINGS

FIGS. 1a, 1b, 1c, and 1d illustrate projectile defeat mechanisms.

FIG. 2 illustrates the results of a gas gun impact test using targets of a single PBO 30×30 (yarns per inch) mesh weave, tightly gripped on four edges, with and without polyethylene felt.

FIG. 3 illustrates the results of a gas gun impact test using targets of one or more PBO mesh weaves of varying yarns per inch, tightly gripped on four edges, with and without polyethylene felt positioned in front of the weave.

FIG. 4 illustrates the results of a push test of a simulated fan blade and a simulated projectile at varying rates of movement on a single or multiple ply PBO weave with and without one or two plies of PBO felt ungripped and positioned in front of the weave.

DESCRIPTION OF THE PREFERRED EMBODIMENTS

Figure 5:
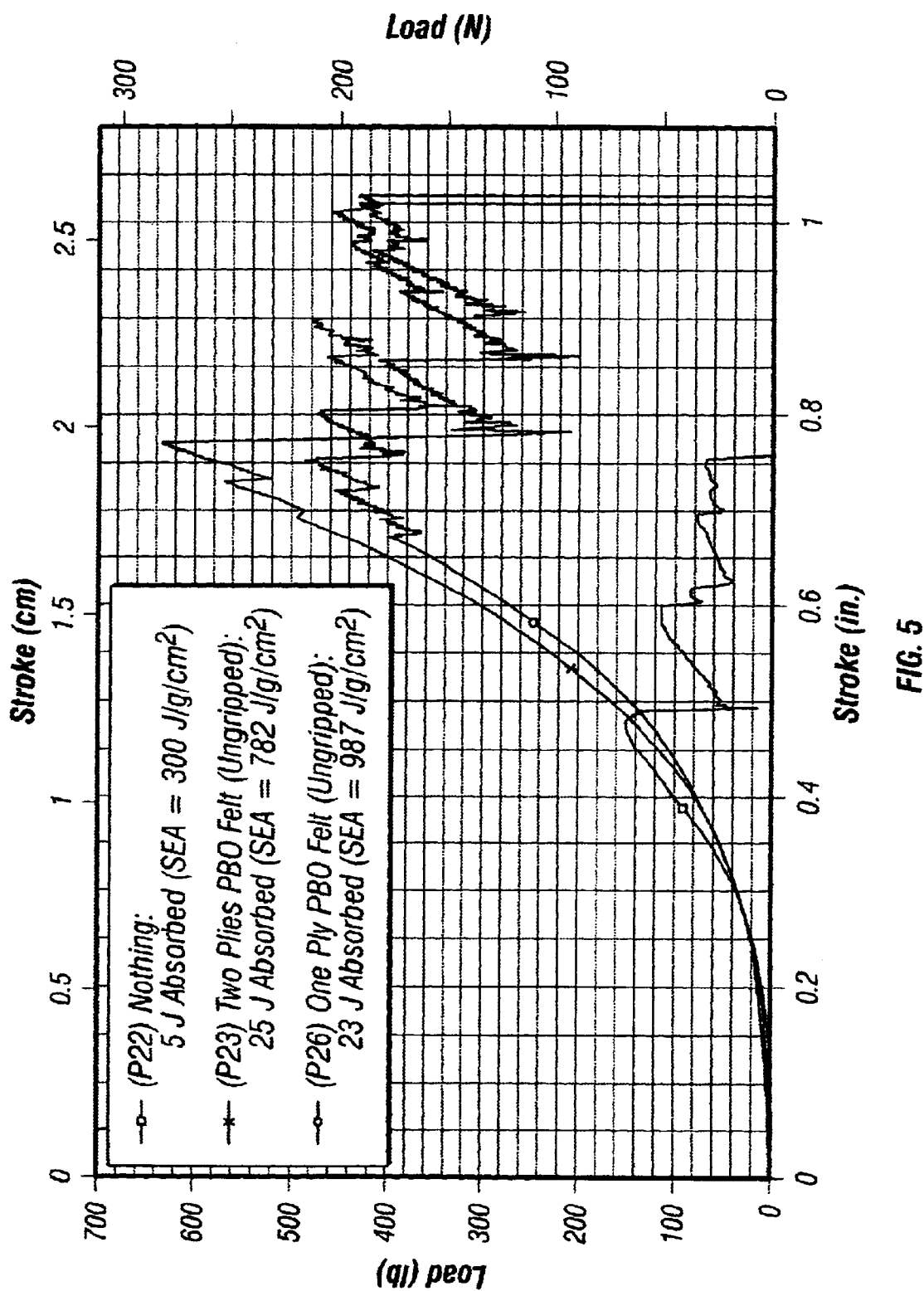
FIG. 5 illustrates the results of push tests of a simulated sharp fan blade at a 45 degree angle of movement and moving at 0.075 in./s on a single ply PBO 35×35 weave gripped on four edges with and without one and two plies of PBO felt ungripped and positioned in front of the weave.
Figure 6:
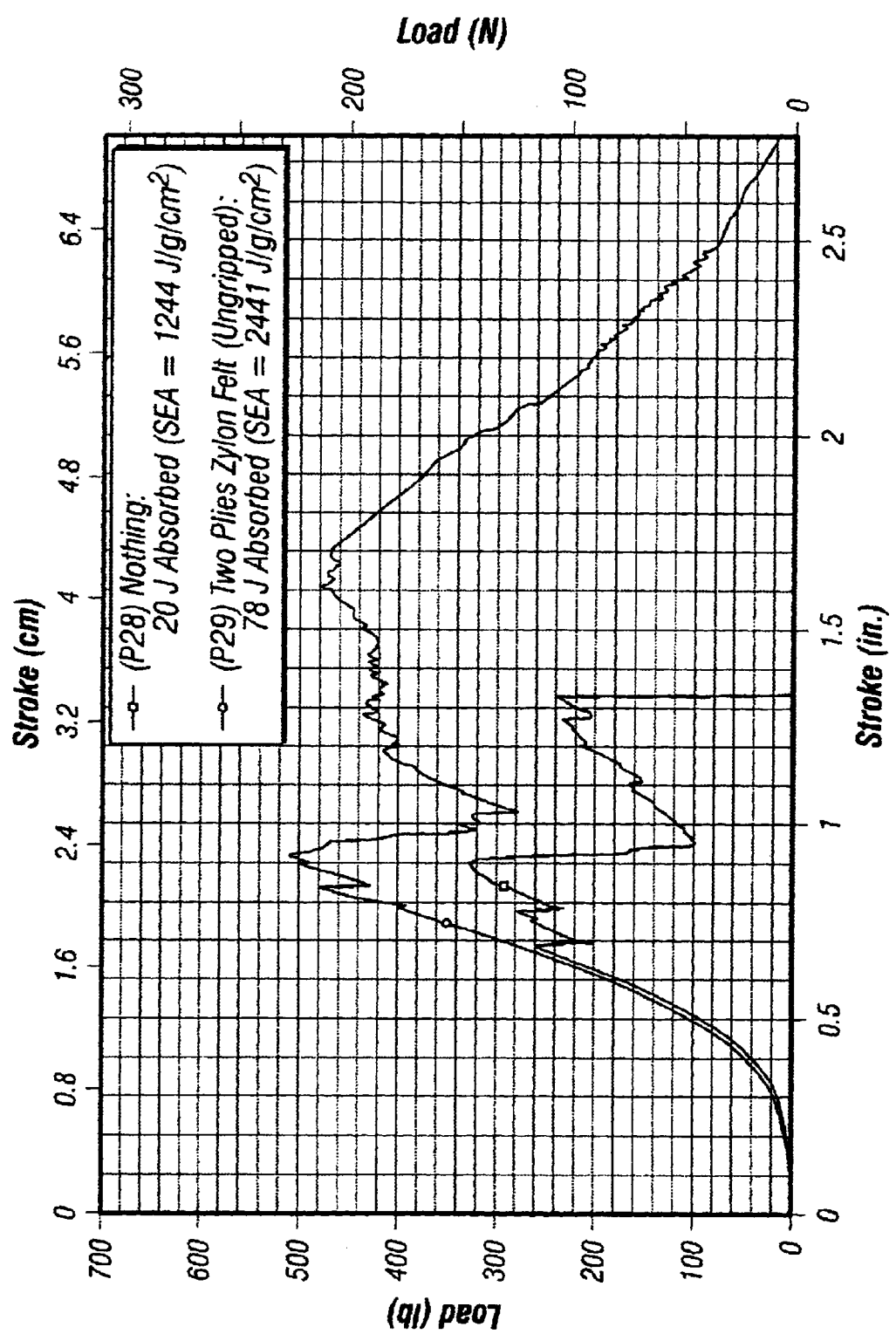
FIG. 6 illustrates the results of push tests of a simulated sharp fan blade at a 45 degree angle of movement and moving at 0.075 in./s on a single ply PBO 35×35 weave gripped on two edges with and without two plies of PBO felt ungripped and positioned in front of the weave.
Figure 7:
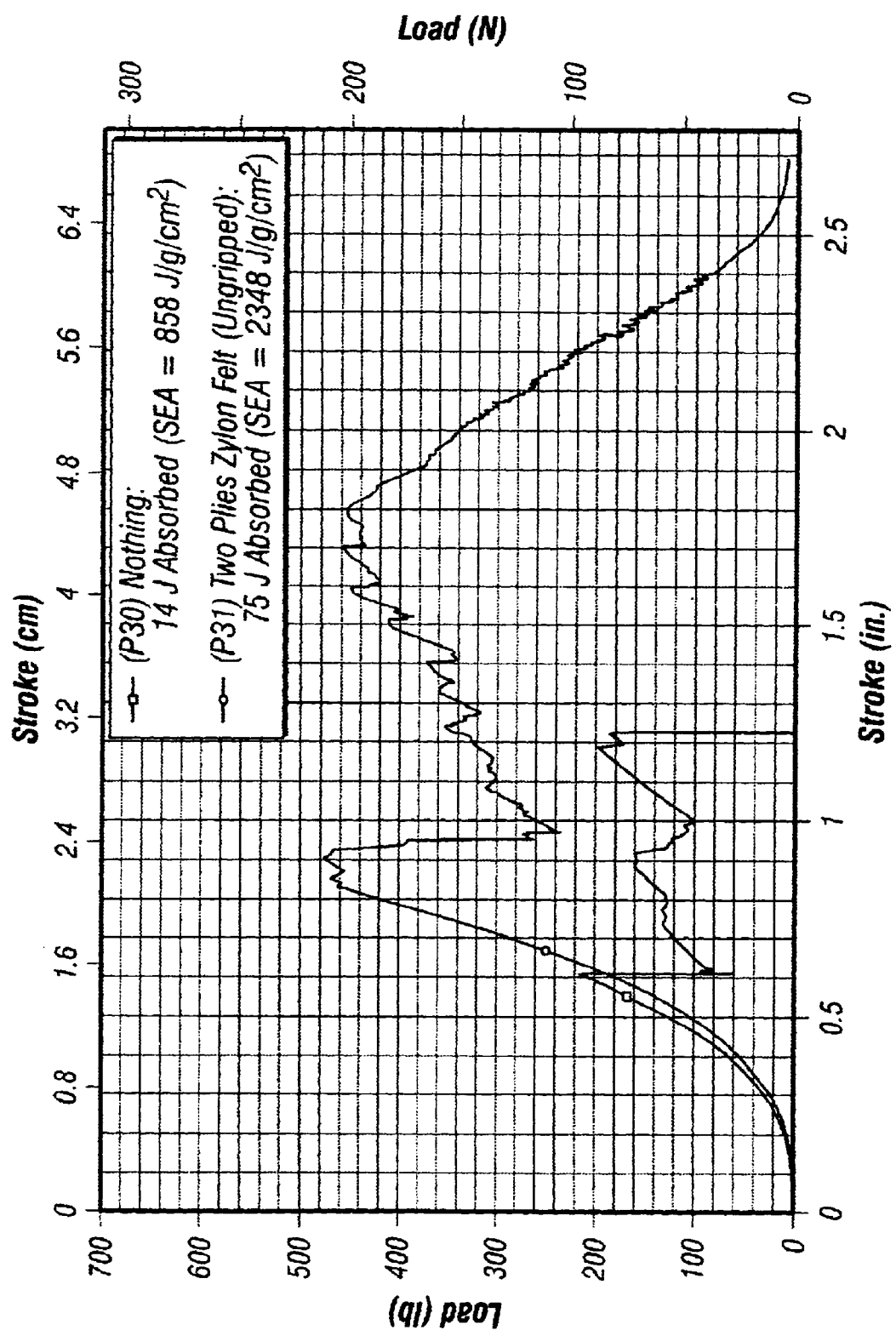
FIG. 7 illustrates the results of push tests of a simulated sharp fan blade at a 45 degree angle of movement and moving at 0.075 in./s on a single ply PBO 35×35 weave gripped on two edges with and without two plies of PBO felt ungripped and positioned in front of the weave.
Figure 8:
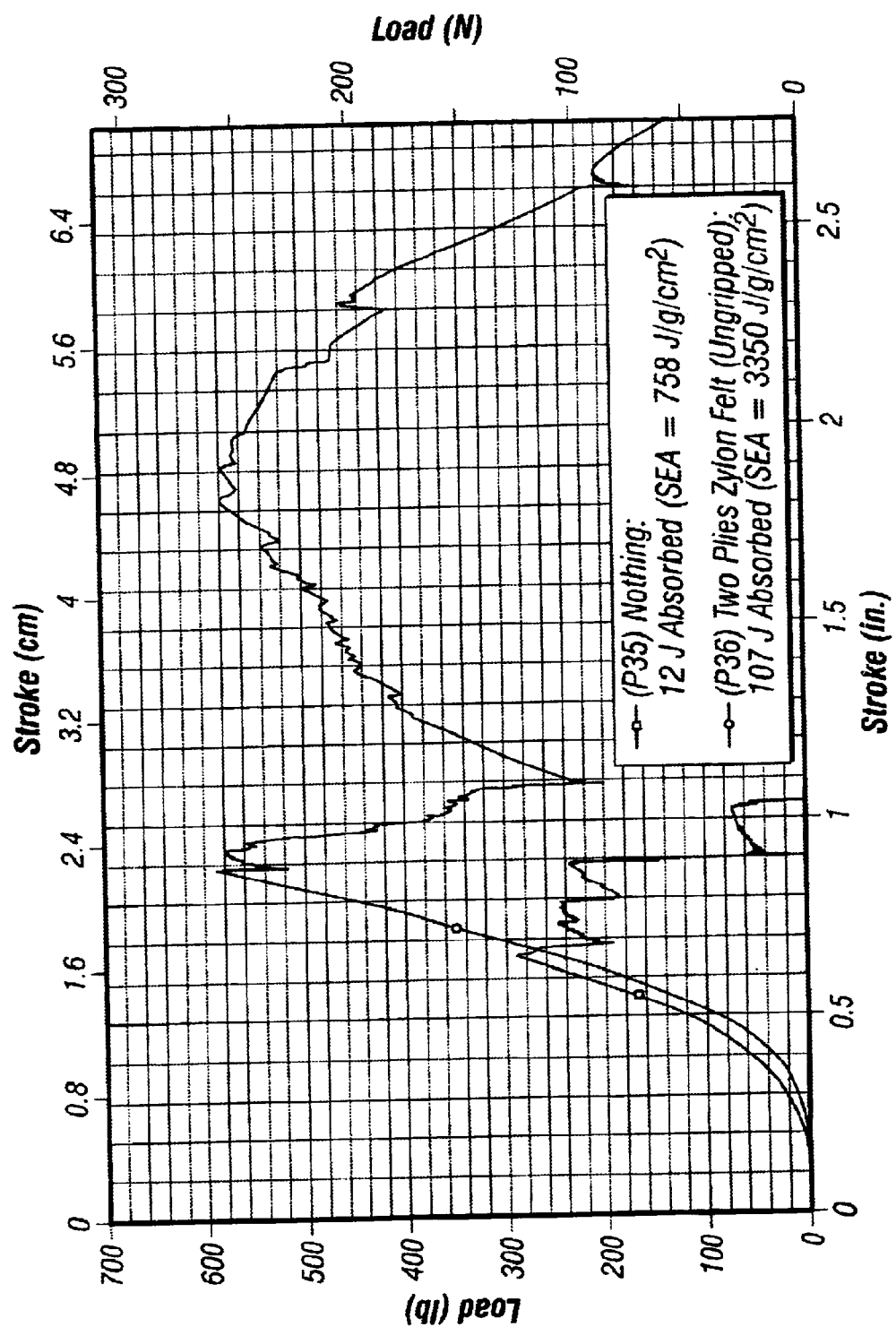
FIG. 8 illustrates the results of push tests of a simulated sharp fan blade at a 0 degree angle of movement and moving at 0.075 in./s on a single ply PBO 35×35 weave gripped on two edges with and without two plies of PBO felt ungripped and positioned in front of the weave.
Figure 9:
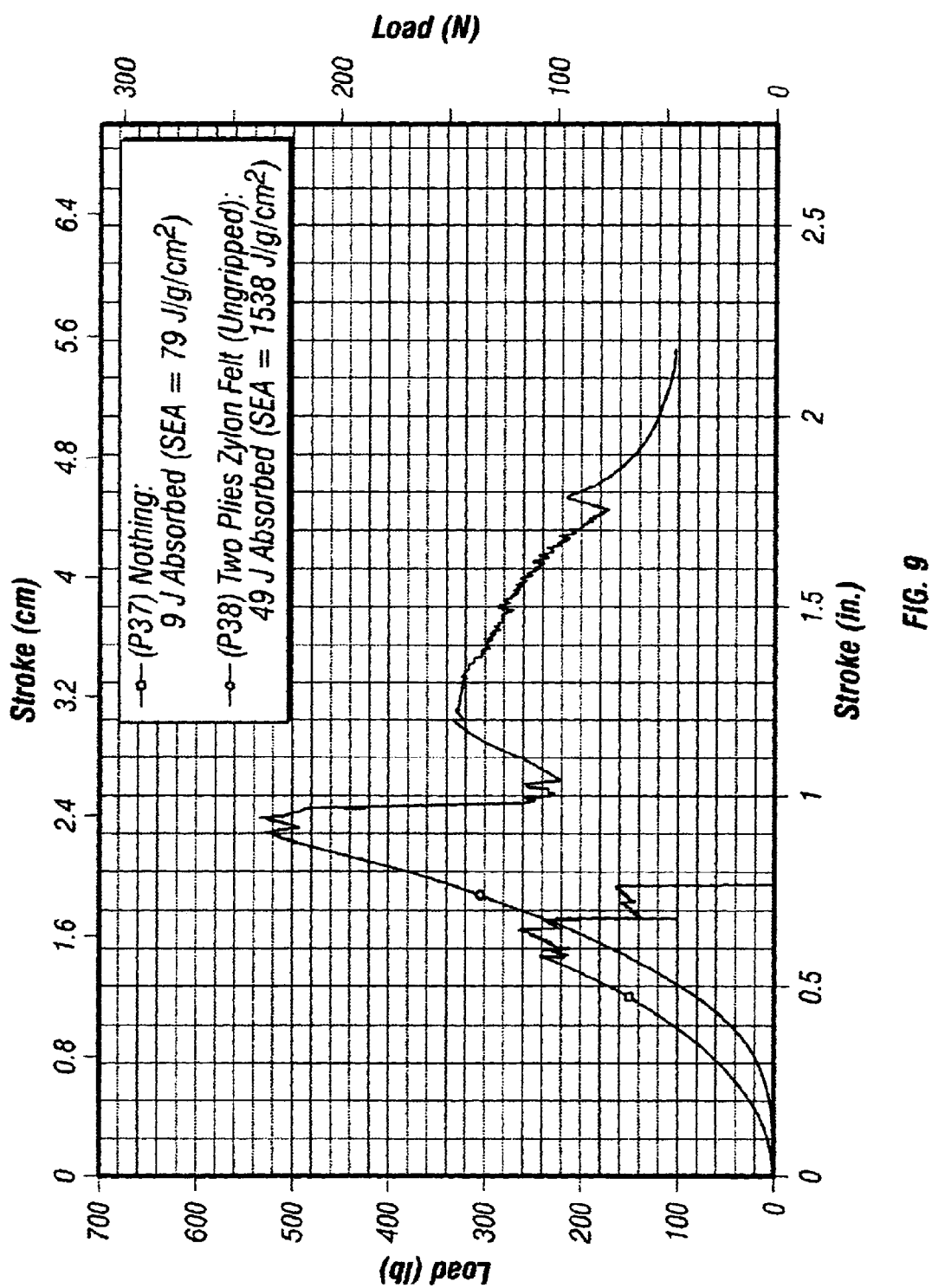
FIG. 9 illustrates the results of push tests of a simulated sharpened fragment at a 0 degree angle of movement and moving at 0.075 in./s on a single ply PBO weave gripped on two edges with and without two plies of PBO felt ungripped and positioned in front of the weave.

The invention includes a low weight, high energy absorbing, multiple function ballistic barrier for use with objects for superior ballistic protection against projectiles, from munitions and/or fragments of high speed machine components.

The ballistic barrier may be constructed of fabrics and felts of high-strength polymer fibers or other ballistic materials. In particular, highly ordered, highly crystalline, high-molecular-weight polymers, because of their low density and high strength are the preferred materials because of their low overall weight and high penetration resistance to profile ratio. Specifically, fibers of aramid, polyethylene, and phenylenebenzole (PBO) materials provide the most useful measure of ballistic protection in the most weight-efficient manner. Polyethylene has the advantage of low density but is not particularly flame resistant. Aramid is more flame resistant, but about 50% more dense than polyethylene. PBO stronger than either aramid or polyethylene, has high flame resistance, and has density comparable to aramid. A combination of two or all of these ballistic materials may be used to produce one or more layers of fabric or felt.

The above materials can be configured in one of many types of constructs such as 2- and 3-dimensional weaves, felts, non-wovens, and lay-ups—either singly or assembled in layers or as laminates, in one of many geometries and fiber mixes, and may include metallic or ceramic or composite materials that are resistant to impact and penetration by projectiles such as fragments or bullets. The various layers of materials absorb energy from impacting projectiles through frictional resistance as adjacent fibers slide over one another.

Particular selection and positioning of the layers and felt can be manipulated to produce ballistic barriers of varying strength and weight. When creating an arrangement including felt and one or more layers of material, the felt should be positioned such that it will be struck by a projectile before the layer or layers are struck. The felt has two ballistic functions: to slow the projectile and blanket the sharp edges of the projectile tip. As the felt engages the projectile and is torn from its lateral fasteners, it deforms substantially, absorbs some energy, and slows the fragment. It does not get penetrated and rides with the projectile to present a larger area, blunter leading edge to the next layer. The felt may also impart some rotation on the projectile. The highest strength/lowest weight felts are constructed by blending fibers of aramids, polyethylenes, PBO, and the like, such as by needle punching to enhance the physical interlocking of cross-lapped layers. Further strengthening is attainable by thermobonding, i.e., applying pressure and heat so that one fiber melts and creates a unique bond through out the fabric.

An example of such a multi-layered barrier structure showing superior protection against penetration by a projectile was achieved by placing one or two sheets of polyethylene felt in contact with a sheet of PBO fabric and impacting a projectile against the layers. The energy required to penetrate the layers is substantially higher in the presence of the felt than for PBO alone. The improvement provided by the felt results from a combination of three factors, namely, the felt blunts the sharp edges of the projectile, increases the effective cross-sectional area of the fragment, and increases the drag of the fragment. Specific properties and characteristics of the barrier structures are obtained by varying the number, order, and thickness of the felt and fabric layers, as well as incorporating other materials into the structure. These parameters can be adjusted to maximize performance against specific projectile threats in specific applications.

The number of layers of material and layers of felt will depend on the anticipated size and velocity of the projectile to be protected against. If it is desired to protect against higher energy fragments, the number of layers can be increased or a multilayer of high strength polymer fiber could be used.

FIG. 2 illustrates the results of a gas gun impact test using targets of a single PBO 30×30 (yarns per inch) mesh weave, tightly gripped on four edges, with and without polyethylene felt. The felt was ungripped and positioned in front of the weave. As shown, the use of one ply of felt nearly doubled the amount of kinetic energy lost by the projectile (FS). When the felt was used, the projectile did not penetrate the felt, but completely penetrated the fabric still surrounded by the felt. When two plies of felt were used, the projectile, surrounded by the felt, remained lodged in a hole in the weave.

FIG. 3 illustrates the results of a gas gun impact test using targets of one or more PBO mesh weaves of varying yarns per inch, tightly gripped on four edges, with and without polyethylene felt positioned in front of the weave. The felt was ungripped and positioned in front of the weave. Again it is seen that the use of felt is very effective in slowing or stopping the projectile. In both tests where the felt was used, the projectile did not pierce the felt.

FIG. 4 illustrates the results of a push test of a simulated fan blade (FB) and a simulated projectile (FS) at varying rates of movement on a single or multiple ply PBO weave with and without one or two plies of PBO felt ungripped and positioned in front of the weave. The simulated fan blade and projectile were oriented at varying angles to the weave. The use of felt greatly increased the load required to break a first yarn of the weave. Further, the load which could be handled by the combination of the weave and the felt was much greater than the weave itself.

FIGS. 5 through 9 illustrate the results of push tests of a simulated sharp fan blade or a simulated sharp projectile at various angles of movement on a single ply PBO weave with and without one or two plies of PBO felt ungripped and positioned in front of the weave. As shown, the use of felt greatly increases the distance which a projectile will be allowed to travel before penetrating the weave, as well as increases the load required to penetrate the weave.

Examples of specific anticipated uses of the ballistic barrier include, but are not limited to, ballistic barriers on aircraft; aircraft luggage and cargo containers; VIP limousines; body armor including helmets; shields for back-of-the-armor debris on battle tanks, personnel carriers; or use on or with any other object where protection against projectiles is important.

Figure 10:
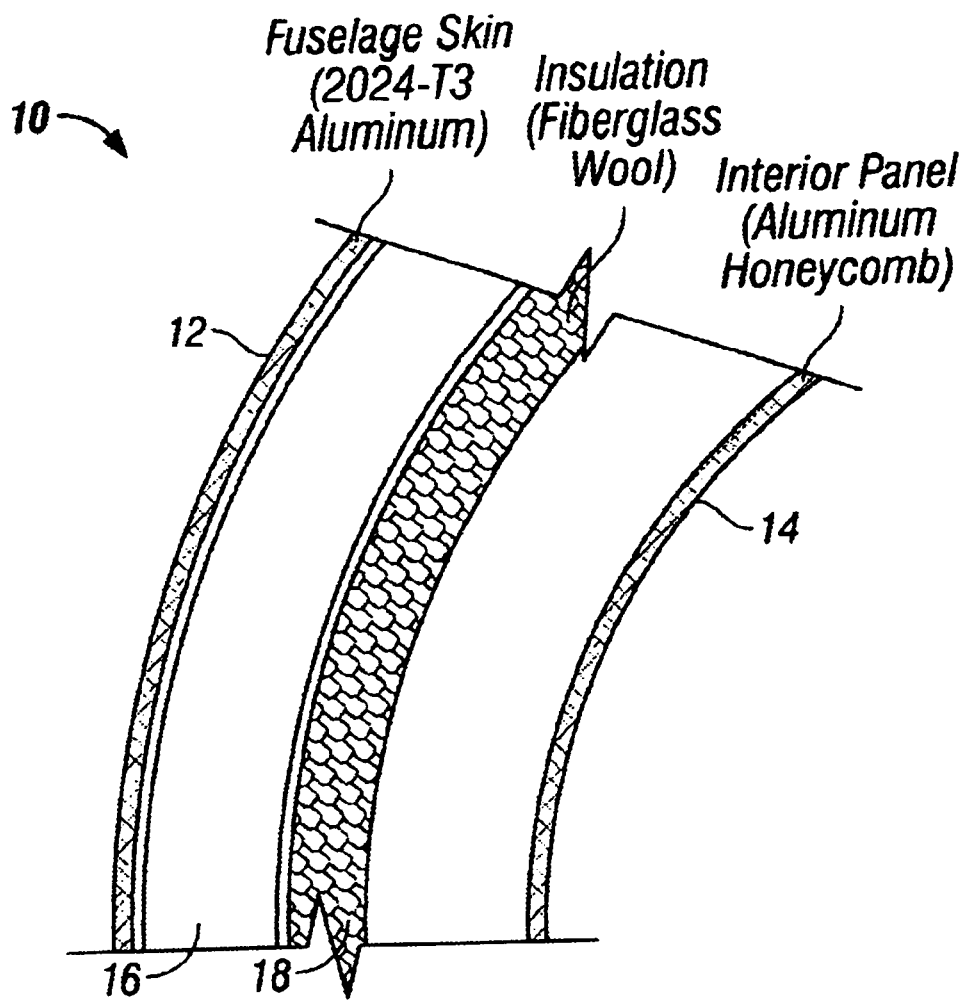
FIG. 10 is an exploded partial cross sectional view of a typical fuselage of an aircraft.

FIG. 10 illustrates a portion of a fuselage 10 of an aircraft that has an outer skin 12, an inner panel 14, a structure 16 positioned between the outer skin and the inner panel, and a layer of insulation 18, which may be positioned between the inner panel and the structure 16 or between the outer skin 12 and the structure 16. Depending on aircraft type, up to 4 to 5 inches of space exists between the outer skin 12 and the inner panel 14 of the fuselage 10. The structure 16 may have a plurality of frames 20 coupled together to form the overall structure 16. See FIG. 11. Together, the frames create a grid of thicker, more fragment-resistant metallic structural beams 22 encompassing roughly 9 by 20 inch generally open areas In these generally open areas, only the outer skin 12, the layer of insulation 18, and the inner panel 14 are in the path of an engine fragment. These areas offer little resistance to penetration from fragments and any critical component behind the area would be impacted with nearly the entire energy of the fragment.

Figure 11:
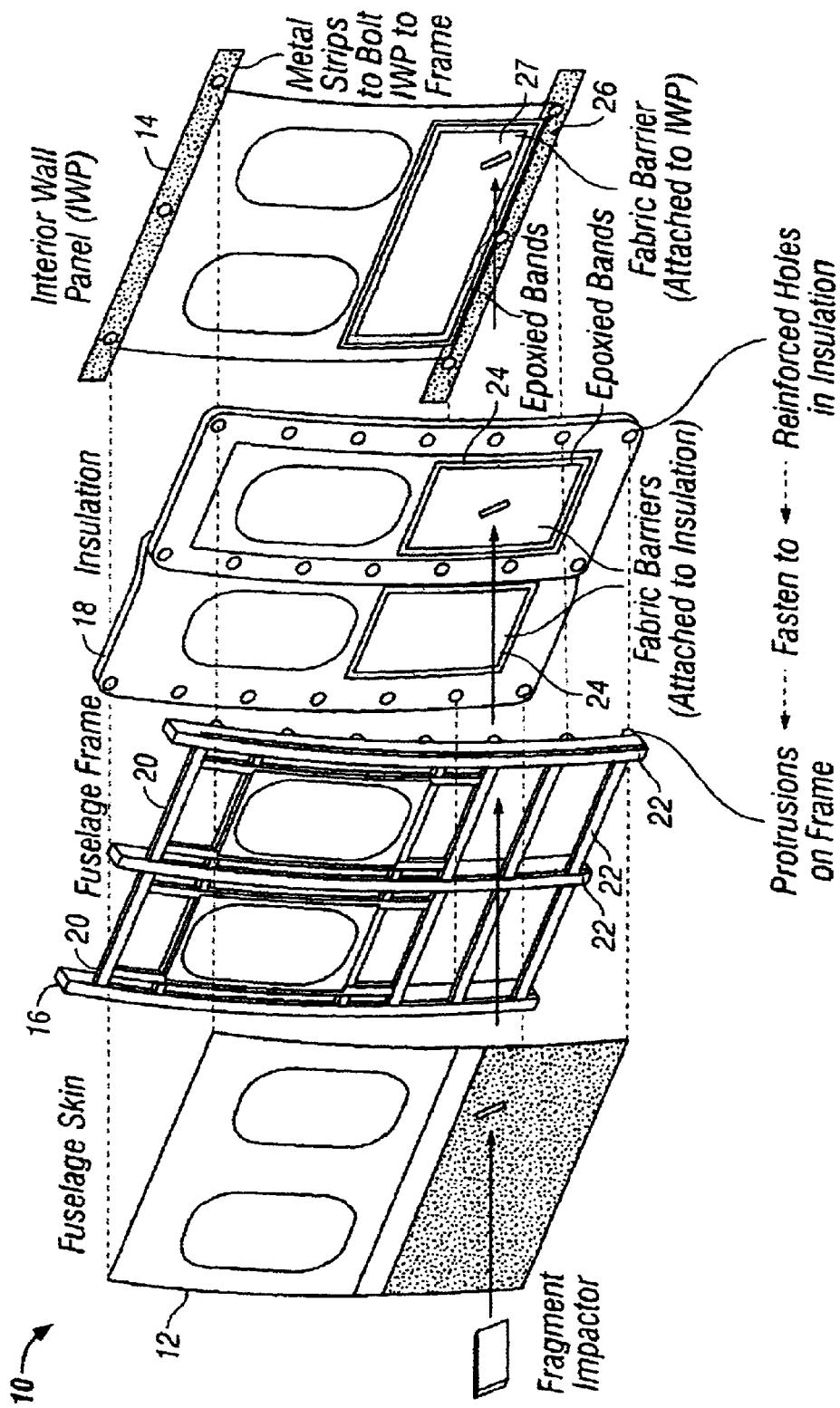
FIG. 11 illustrates a positioning of several layers of the ballistic barrier on the layers of insulation and inner panel of the fuselage of an aircraft.

FIG. 11 illustrates a first application of the present invention designed to enhance the survivability of commercial and military aircraft in the event of an uncontained turbine engine failure or impact of projectiles from any source. One or more layers of high strength fabric 24, 26, which together form the ballistic barrier 27, are substantially fixedly positioned between the outer skin 12 and the inner panel 14 of the fuselage 10. The layers 24 plastically deform to absorb the kinetic energy of low-energy projectiles, which prevents the projectiles from penetrating the fuselage wall and then severing control lines, injuring passengers, or entering and exiting the fuselage 10 and damaging a second engine.

Constraints such as window positioning and points of coupling of the various components of the fuselage 10 requires that noncritical areas be left unprotected. Therefore, as shown in FIG. 11, the ballistic barrier 27 can be positioned to slow or stop projectiles that strike the substantially open areas. Within the grid boundaries of the structure 16. For example, smaller sized layers 24 may be coupled to the layer of insulation 18 to slow or stop projectiles that penetrate the fuselage 10 skin. Alternatively or in combination with the layers 24 coupled to the layers of insulation as an added measure of protection, larger sized layers 26 may be positioned toward or coupled to the inner panel 14 of the fuselage 10. Any projectile that breaches the smaller sized layers 24 strikes the larger sized layers 26 with greatly reduced energy.

Figure 12:
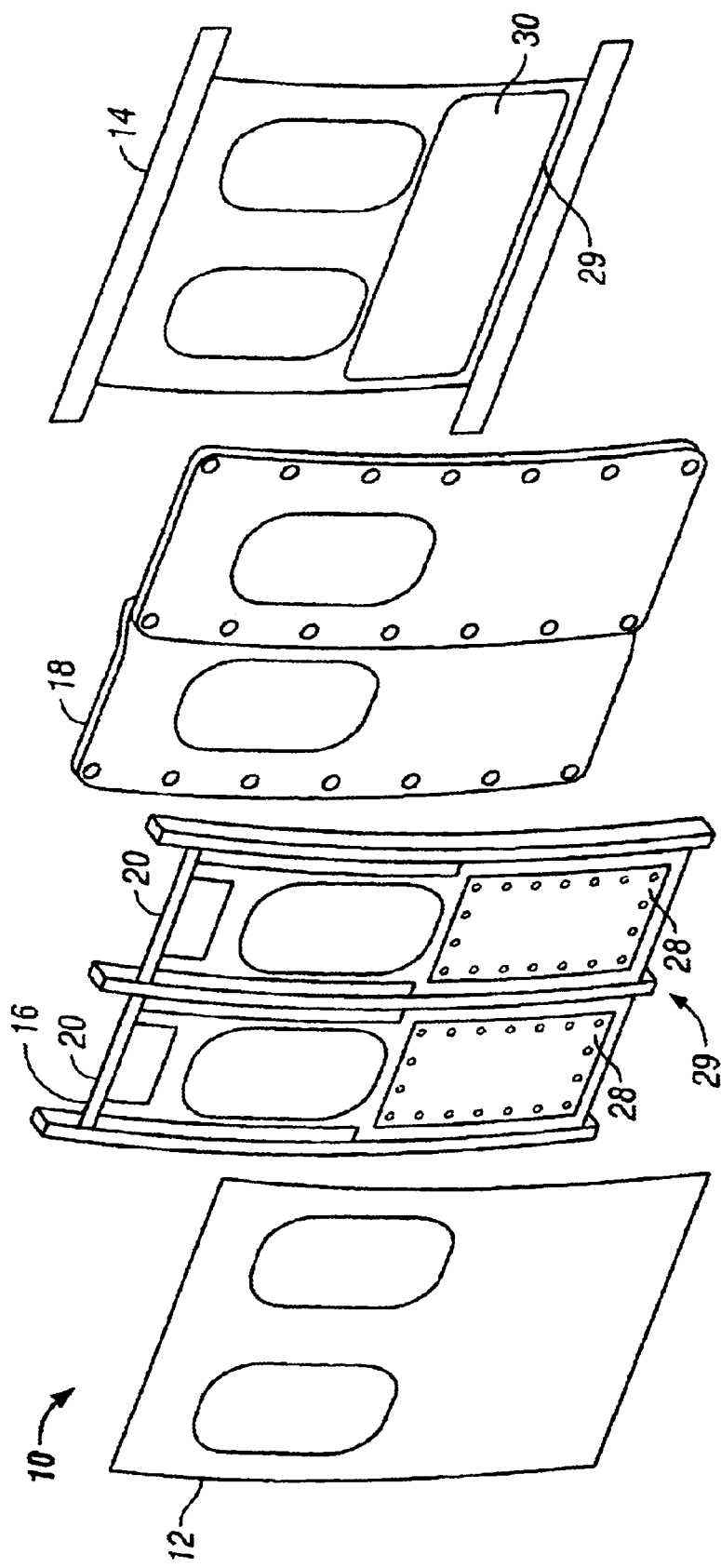
FIG. 12 illustrates a positioning of one or more layers of the ballistic barrier on the structure of the fuselage of an aircraft.

FIG. 12 illustrates another embodiment of the present invention. Layers 28 of the ballistic barrier 29 are attached to the frames 20 of the structure 16. The layers 28 can be positioned to cover the generally open areas of the frames 20. Projectiles striking the structural beams 22 of the structure 16 are slowed, stopped, or deflected. The layers 28 slow or stop projectiles attempting to pass through the substantially open spaces of the frames 20 of the structure 16.

In a configuration where the ballistic barrier 29 is positioned between the outer skin 12 and layer of insulation 18 of the fuselage 10, as in the embodiment shown in FIG. 12, the layer or layers 28 of the ballistic barrier 29 engage the projectile after it penetrates the outer skin 12 of the fuselage 10. The high tensile strength and cut resistant properties of the ballistic fabric resist penetration by the projectile, so that the layer or layers 28 of the ballistic barrier along with the layer of insulation 18 are pulled in the direction of the projectile, their mass and bulk exerting drag loads on the projectile and slowing it. As the projectile contacts the inner panel 14 of the fuselage 10, it is slowed and has a blunted edge because of the fabric and insulation draped over it. The inner panel 14 resists the draped projectile and may stop its progress or be penetrated. In the later situation, the fabric and insulation will begin to be pulled through the hole in the inner panel 14, exerting additional drag as the draping material is resisted by friction at the hole periphery. The projectile may be stopped after modest ingress into the passenger cabin, or in the case of a sufficiently energetic projectile, may continue with reduced velocity. The stopping power of the inner panel 14 may be enhanced as desired by coupling a layer or layers 30 of ballistic fabric to the outboard side of the inner panel 14.

Figure 13:
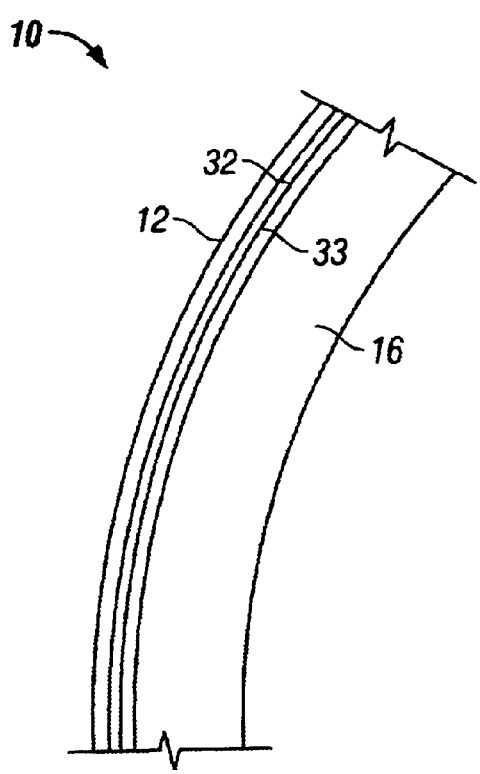
FIG. 13 illustrates a positioning of one or more layers of the ballistic barrier towards the outer skin of the fuselage of an aircraft.

In FIG. 13 yet another embodiment of the present invention is illustrated. A layer or layers 32 of the ballistic barrier 33 are positioned towards the outer skin 12 of the fuselage 10. This configuration provides greater protection to interior components of the aircraft, such as fuel and control lines. Further, this arrangement is especially adapted to provide resistance to projectile penetration into nonpassenger portions of the aircraft which may or may not have inner panels 14 such as, for example, cargo areas and landing gear bay doors.

Figure 14:
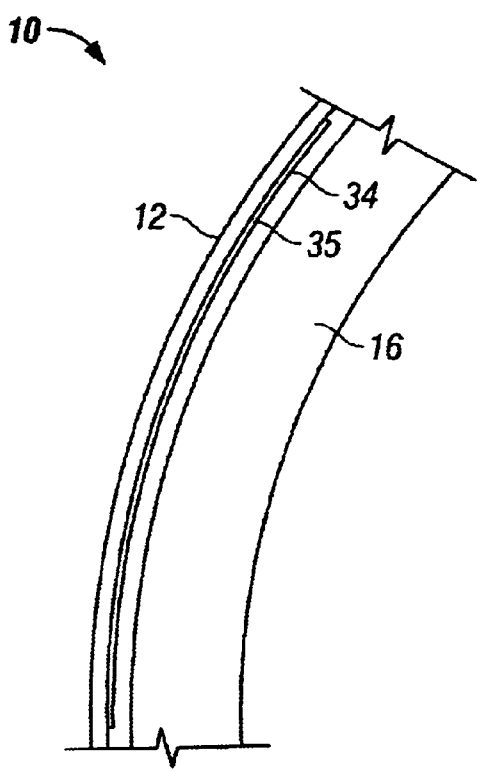
FIG. 14 illustrates a positioning of one or more layers of the ballistic barrier coupled to the outer skin of the fuselage of an aircraft.
Figure 15:
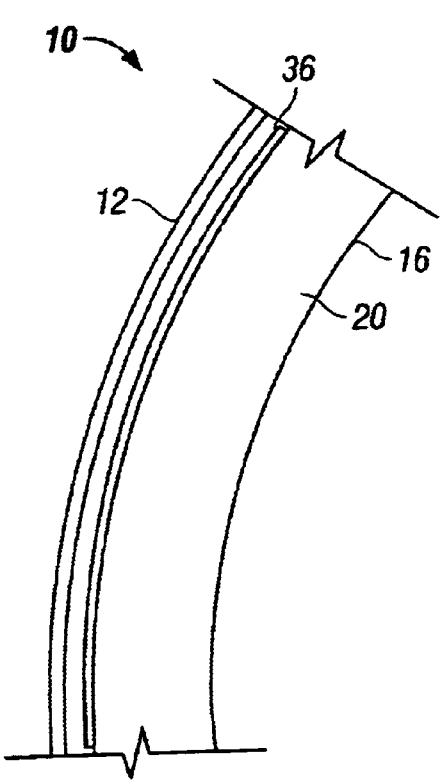
FIG. 15 illustrates a positioning of one or more layers of the ballistic barrier towards the outer skin of the fuselage of an aircraft and coupled to the structure.

The ballistic barrier may be substantially fixedly positioned with respect to the fuselage 10, or may be fixedly coupled to the components of the fuselage 10 such that it is fixedly positioned with respect to the outer skin 12 or structure 16. A layer 34 of the ballistic barrier 35 may be coupled directly to the outer skin 12 of the fuselage 10 as shown in FIG. 14. An advantage of coupling the layers 34 of the ballistic barrier 35 directly to the outer skin 12 of the fuselage 10 is to conserve the pressure boundary. Such an arrangement minimizes the areas of perforation and prevents widespread tearing of the outer skin 12. Alternatively, the layer 36 may be coupled to the frames 20 of the structure 16 as shown in FIG. 15. The layer 36 should be coupled to the structure 16 close to the outer skin 12 but separated from it by a small distance so as not to trap moisture against the outer skin 12 and cause corrosion.

Figure 16:
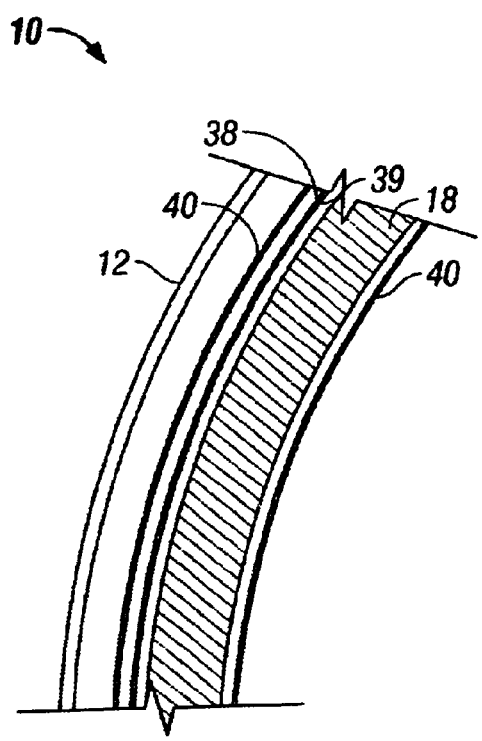
FIG. 16 illustrates a positioning of one or more layers of the ballistic barrier within the outer covering of the layer of insulation of the fuselage of an aircraft.

In FIG. 16, a layer 38 of the ballistic barrier 39 is positioned within an outer covering 40 of a layer of insulation 18 positioned towards the outer skin 12 of the fuselage 10 (i.e., with the layer 38 positioned towards the outer skin 12). This configuration has the advantage of preventing absorption of condensation by the layer 38. The outer covering 40 acts as a barrier to moisture that condenses on the various components of the fuselage 10. To obtain an additional increment of ballistic resistance, the outer covering 40 of the layer of insulation 18 could be one or more layers of a strong impervious-to-water material such as a bonded fiber layup.

Figure 17:
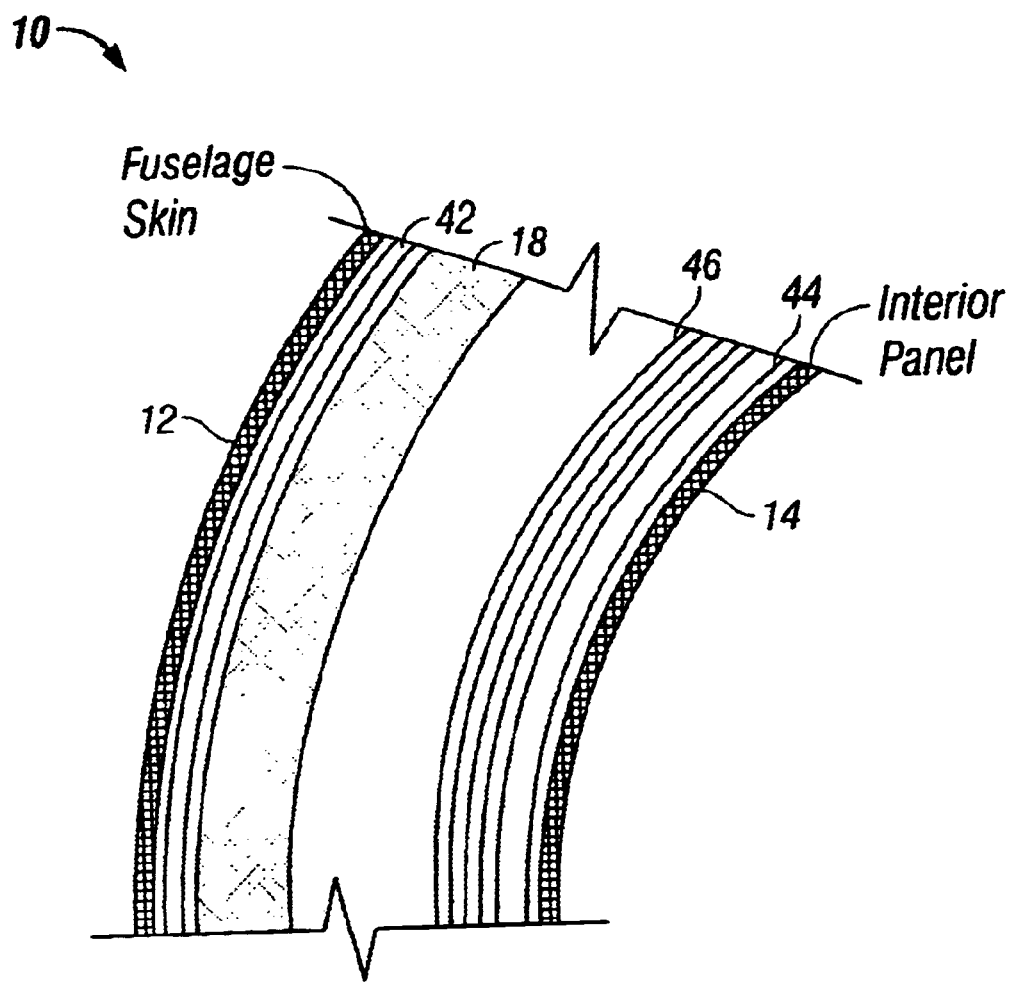
FIG. 17 illustrates a multi-layer embodiment of the present invention.

FIG. 17 illustrates a multi-layer embodiment of the present invention. Felt 42 is used in combination with a layer of high strength fiber layup 44. The felt 42 is positioned on an outer side of the layer of insulation 18. The layer of high strength fiber layup 44 is positioned adjacent the inner panel 14. If desired to stop fragments of high velocity which could penetrate both the felt 42 and the layer of high strength fiber layup 44, several layers of ballistic fabric 46 may be positioned between the layer of insulation 18 and the layer of high strength fiber layup 44. The felt 42 should be coupled to the structure 16 close to the outer skin 12 but separated from it by a small distance so as not to trap moisture against the outer skin 12 and cause corrosion.

There are several methods to substantially fixedly position the layers of the ballistic barrier with respect to the fuselage 10. For example, the layers may be held in place by friction such as being pinched between two components of the fuselage 10. One example would be positioning a layer between a layer of insulation 18 and the structure 16 of the fuselage 10 and pressing the insulation against the structure 16 such that the layer will not be substantially repositioned by vibration from travel or weight due to water absorption. In another example, a layer may be positioned inside an outer covering of the insulation between the outer covering and the insulating material, as discussed above.

Alternatively, a layer may be fixedly coupled to the component of the fuselage 10 to which the layer is most closely positioned. An adhesive may be used to attach the layer to the components of the fuselage 10. Further, the layer may be coupled to the components of the fuselage 10 with fasteners. Regardless of the method used to hold the layers in place, the layers should be held sufficiently in place so that they can absorb the energy of the projectile without being pulled along with the projectile more than is necessary to slow or stop the projectile. However, it should be noted that any layer of felt should be allowed to become detached from the fuselage 10 so that it may travel with the projectile.

As an option, the added weight and cost of insertion of the ballistic barrier may be minimized by replacing existing materials in the fuselage 10 wall with dual function ballistic materials. The ballistic barrier may be constructed of materials having high specific boistic protection that can simultaneously perform the functions of, and perhaps replace, existing components of the fuselage 10. Exemplary existing components of the fuselage 10 are the layer of insulation 18 and the inner panel 14. Their replacement with the ballistic barrier thus requires the ballistic barrier to provide adequate thermal insulation, acoustic insulation, flame resistance, moisture resistance, and aesthetics. From the standpoint of fire, three issues are critical: flammability, smoke production, and toxicity of the gas produced.

Figure 18:
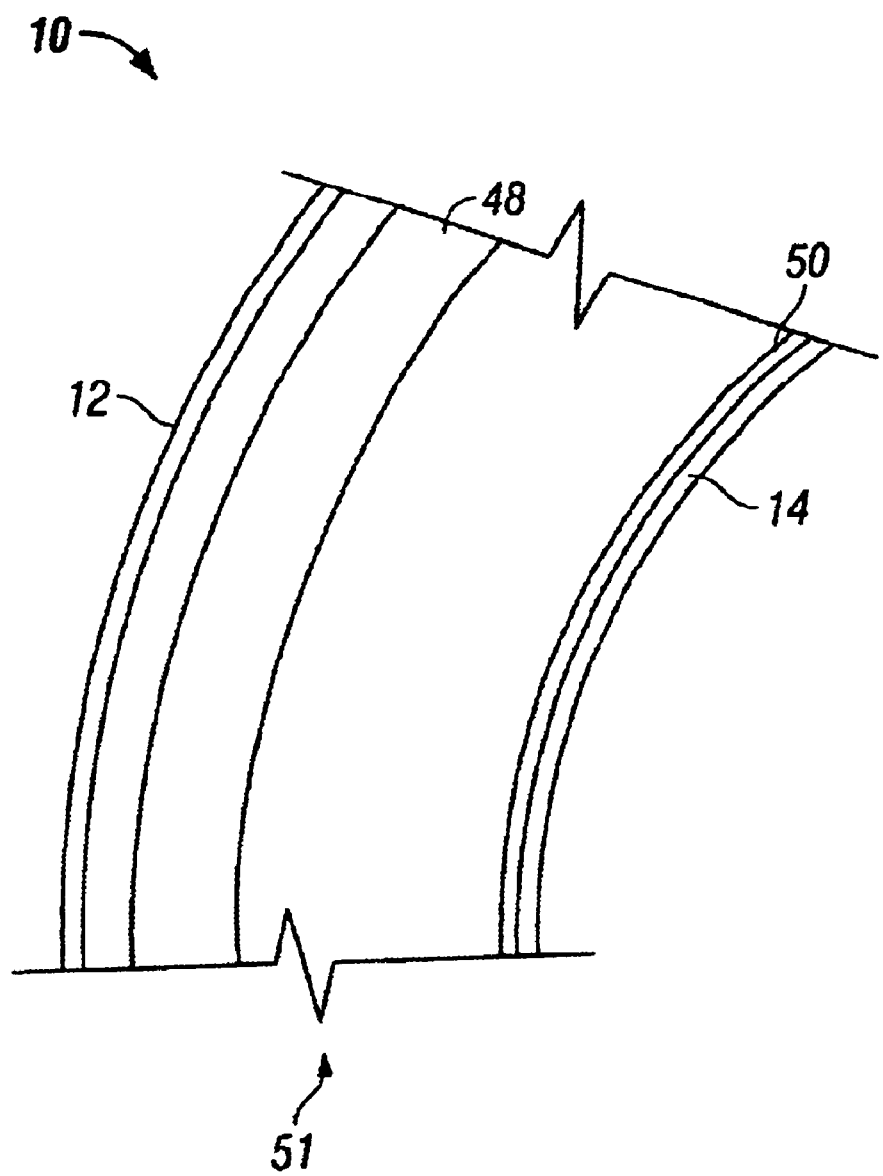
FIG. 18 Illustrates a multi-layer embodiment of the present invention with felt replacing the layer of insulation.

Aramid, polyethylene, and PBO materials have sufficient flame resistance, water absorption resistance, and thermal and acoustic insulation properties to serve as such building materials for multi purpose ballistic barriers. As shown in FIG. 18, for example, felt 48 replaces the current insulation material. It should be noted that the felt 48 can be used to replace only a portion of the insulation material as well. A layer of high strength material 50 may be positioned along the inner panel 14 of the fuselage. As another example, the inner panel 14 of the fuselage 10 may be constructed of a projectile resistant polymeric material, such as one or more of aramid, polyethylene, and PBO, so that the inner panel 14 forms part of the ballistic barrier 51.

Figure 19:
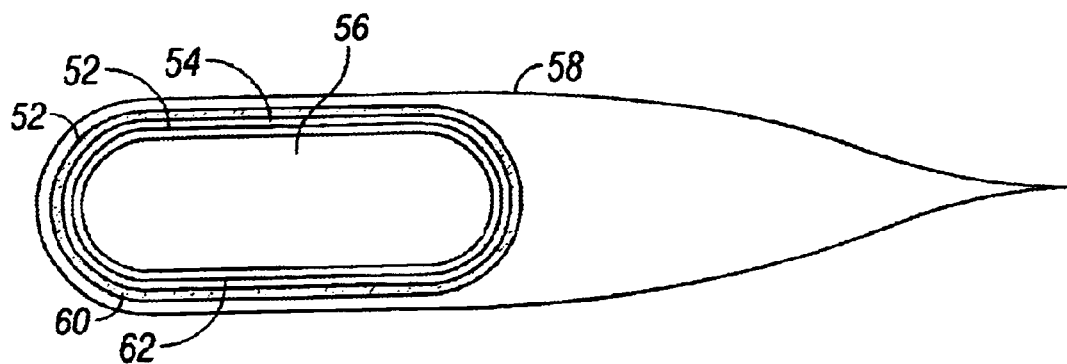
FIG. 19 illustrates how the ballistic barrier may also be used to protect interior components of an aircraft such as a fuel tank.

The ballistic barrier may also be used to protect interior components of an aircraft, especially in portions of the aircraft where moving parts makes attachment of the ballistic barrier difficult or impossible. For example, in FIG. 19, the layers 52 of the ballistic barrier 54 surrounds a fuel tank 56 in a wing 58 of the aircraft. In this exemplary embodiment, felt 60 surrounds a layer of ballistic material 62. A projectile striking the ballistic barrier 54 would be slowed or stopped by the ballistic barrier before striking the tank. In the event that the projectile does pierce the fuel tank 56, the felt 60 acts as an insulator to prevent the projectile from creating a spark that could ignite the fuel in the fuel tank 56 as well as helps slow leakage from the newly created hole. Other exemplary internal components of the aircraft that could be protected include computers and other electronic equipment, hydraulics, and the like.

Figure 20:
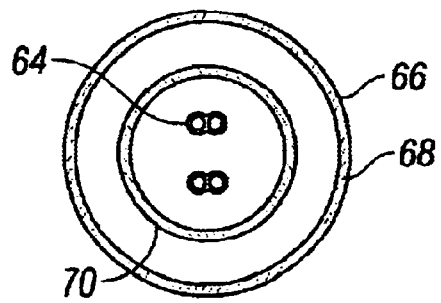
FIG. 20 illustrates how a component such as a control line disposed within the aircraft fuselage may be protected by wrapping at least one layer of the ballistic barrier around the component.

FIG. 20 illustrates how a component 64 such as a control line disposed within the aircraft fuselage may be protected by wrapping at least one layer 66 of the ballistic barrier 68 around the component 64. The high strength of the layer 66 helps prevent a projectile from piercing the outer covering 70 of the component 64. The layer 66 may be wrapped loosely around the component to urge deflection of an impacting projectile.

Figure 21:
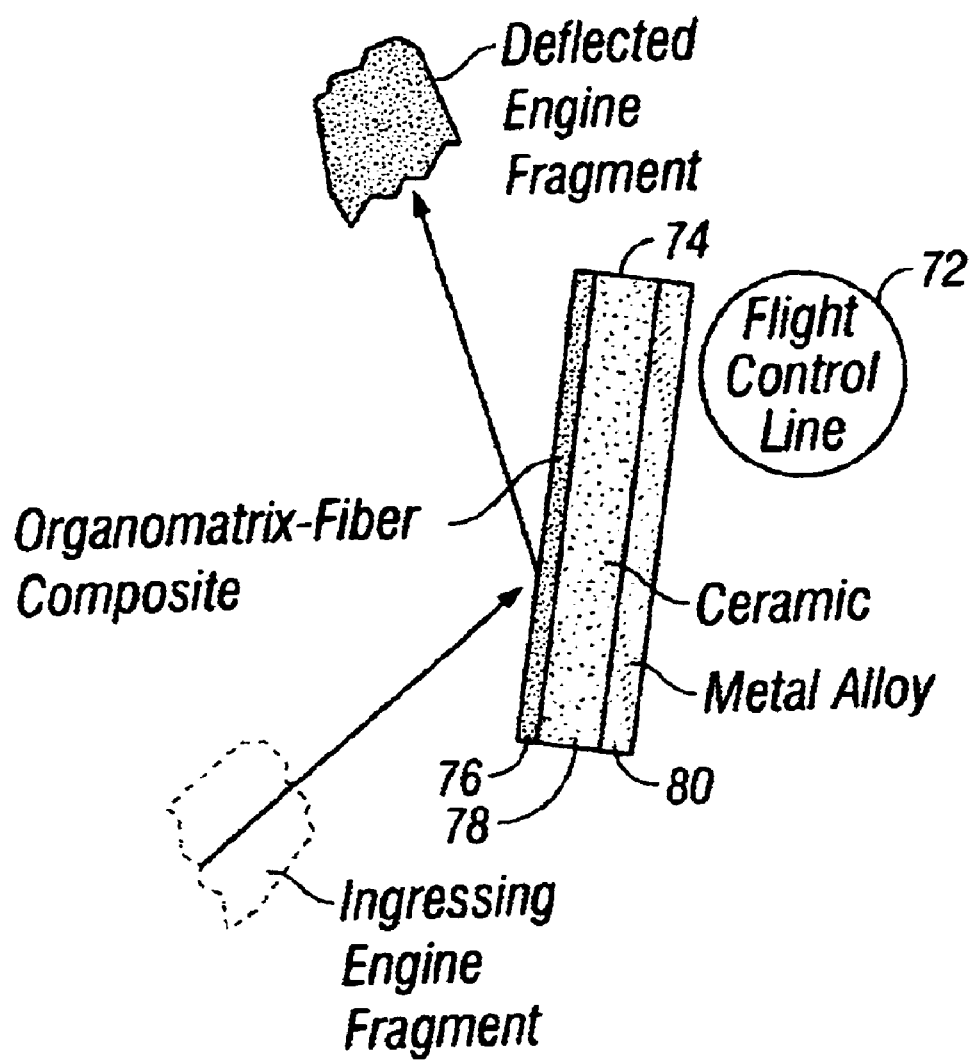
FIG. 21 illustrates an embodiment of the present invention to provide local protection to fuel and control lines.

FIG. 21 illustrates another embodiment of the present invention to provide local protection to inner components 72 of an aircraft, such as fuel and control lines. Fuel lines and flight control lines, whether hydraulic, wire, or optical, are likely to be most efficiently protected by local ballistic barriers 72 positioned near the line and in the path of the expected fragment trajectory. In such an embodiment, the ballistic barrier 74 is constructed of one or more layers of a high strength material that are oriented at an incline relative to an anticipated line of motion of a projectile to deflect the projectile away from the component 72. Such a ballistic barrier 74 could make use of existing aircraft structure, such as longerons, cargo bay floor, and baggage compartment, for mounting.

The high strength material should comprise a laminate of one or more of polymer material 76, ceramic material 78, and metal alloy 80. The polymer material 76 can be constructed,in a weave, ply, or any other configuration. In an embodiment where the layer of high strength material comprises a laminate of polymer material 76 with a ceramic material 78 and/or metal alloy 80, the polymer material 76 should be positioned such that it will be struck by the projectile first. In an embodiment where the layer of high strength material comprises a laminate of ceramic material 78 and metal alloy 80, the ceramic material 78 should be positioned such that it will be struck by the projectile first. If all three materials are used, the ceramic material 78 should be positioned between the polymer material 76 and metal alloy 80.

Although the invention is described herein with reference to several preferred embodiments, one skilled in the art will readily appreciate that permutations, substitution, additions and equivalents may be substituted for the embodiments set forth herein without departing from the spirit and scope of the present invention. It is therefore intended that the following appended claims be interpreted as including all such permutations, substitutions, additions, and equivalents as fall within the true spirit and scope of the present inventions.

What is claimed is:

1. A ballistic barrier in combination with a fuselage of an aircraft for protecting the aircraft from damage due to projectile penetration, the fuselage comprising an outer skin, an inner panel and a structure, the ballistic barrier comprising:

at least one layer of fabric capable of absorbing a kinetic energy of a fragment, munition or projectile;

one other layer of fabric capable of absorbing the kinetic energy is disposed within said inner panel;

wherein the one other layer of fabric capable of absorbing the kinetic energy of a fragment, munition or projectile is coupled to at least one layer of insulation, said insulation layer being disposed within an insulation frame, wherein said insulation frame is positioned between the outer skin and the inner panel; and wherein said at least one layer of fabric is substantially aligned with the inner panel and the outer skin.

2. The ballistic barrier as recited in claim 1 wherein the at least one layer of fabric capable of absorbing the kinetic energy of a fragment, munition or projectile comprises a plurality of plies.

3. The ballistic barrier as recited in claim 2 wherein one of the plies is a felt.

4. The ballistic barrier as recited in claim 2 wherein at least one of the plies is comprised of woven fibers.

5. The ballistic barrier as recited in claim 1 wherein the at least one layer of fabric capable of absorbing the kinetic energy of a fragment, munition or projectile is comprised of woven fibers.

6. The ballistic barrier as recited in claim 1 wherein the at least one layer of fabric capable of absorbing the kinetic energy of a fragment, munition or projectile comprises a polymer material.

7. The ballistic barrier as recited in claim 1 wherein the at least one layer of fabric capable of absorbing the kinetic energy of a fragment, munition or projectile comprises aramid material.

8. The ballistic barrier as recited in claim 1 wherein the at least one layer of fabric capable of absorbing the kinetic energy of a fragment, munition or projectile comprises polyethylene material.

9. The ballistic barrier as recited in claim 1 wherein the at least one layer of fabric capable of absorbing the kinetic energy of a fragment, munition or projectile comprises polybenoxazole material.

10. The ballistic barrier as recited in claim 1 wherein the at least one layer of fabric capable of absorbing the kinetic energy of a fragment, munition or projectile is fixedly positioned between the outer skin and the inner panel.

11. A ballistic barrier in combination with a fuselage of an aircraft for protecting the aircraft from damage due to projectile penetration, the fuselage comprising an outer skin, an inner panel and a structure, the ballistic barrier comprising:

at least one layer of fabric capable of absorbing the kinetic energy of a fragment, munition or projectile positioned towards the outer skin; and the at least one layer of fabric capable of absorbing the kinetic energy of a fragment, munition or projectile being substantially fixedly positioned with respect to the fuselage;

wherein the at least one layer of fabric capable of absorbing the kinetic energy of a fragment, munition or projectile is attached to a layer of insulation positioned towards the outer skin;

one other layer of fabric capable of absorbing kinetic energy is disposed within said inner panel; and wherein said at least one layer of fabric is substantially aligned with the inner panel and the outer skin.

12. The ballistic barrier as recited in claim 11 wherein the at least one layer of fabric capable of absorbing the kinetic energy of a fragment, munition or projectile comprises a plurality of plies.

13. The ballistic barrier as recited in claim 12 wherein one of the plies is a felt.

14. The ballistic barrier as recited in claim 12 wherein at least one of the plies is comprised of woven fibers.

15. The ballistic barrier as recited in claim 11 wherein the at least one layer of fabric capable of absorbing the kinetic energy of a fragment, munition or projectile is comprised of woven fibers.

16. The ballistic barrier as recited in claim 11 wherein the at least one layer of fabric capable of absorbing the kinetic energy of a fragment, munition or projectile comprises a polymer material.

17. The ballistic barrier as recited in claim 11 wherein the at least one layer of fabric capable of absorbing the kinetic energy of a fragment, munition or projectile comprises aramid material.

18. The ballistic barrier as recited in claim 11 wherein the at least one layer of fabric capable of absorbing the kinetic energy of a fragment, munition or projectile comprises polyethylene material.

19. The ballistic barrier as recited in claim 11 wherein the at least one layer of fabric capable of absorbing the kinetic energy of a fragment, munition or projectile comprises polybenzoxazole material.

20. The ballistic barrier as recited in claim 11 wherein the at least one layer of fabric capable of absorbing the kinetic energy of a fragment, munition or projectile is fixedly positioned with respect to the outer skin.

* * * * *